US009332553B2

(12) United States Patent
Markwart et al.

(10) Patent No.: US 9,332,553 B2
(45) Date of Patent: May 3, 2016

(54) USE OF LICENSED SHARED SPECTRUM IN A RADIO ACCESS NETWORK WHERE SIGNAL PROPAGATION IS UNKNOWN

(71) Applicant: Nokia Siemens Networks Oy, Espoo (FI)

(72) Inventors: Christian Markwart, Munich (DE); Simone Redana, Munich (DE); Karl-Josef Friederichs, Puchheim (DE)

(73) Assignee: Nokia Solutions and Networks Oy, Espoo (FI)

( * ) Notice: Subject to any disclaimer, the term of this patent is extended or adjusted under 35 U.S.C. 154(b) by 322 days.

(21) Appl. No.: 13/935,717

(22) Filed: Jul. 5, 2013

(65) Prior Publication Data

US 2014/0011509 A1    Jan. 9, 2014

(30) Foreign Application Priority Data

Jul. 6, 2012    (WO) .................. PCT/EP2012/063202

(51) Int. Cl.
| | | |
|---|---|---|
| *H04W 64/00* | (2009.01) | |
| *H04W 72/08* | (2009.01) | |
| *H04W 16/14* | (2009.01) | |
| H04W 16/10 | (2009.01) | |
| H04W 16/16 | (2009.01) | |

(52) U.S. Cl.
CPC ............ *H04W 72/082* (2013.01); *H04W 16/14* (2013.01); *H04W 16/10* (2013.01); *H04W 16/16* (2013.01)

(58) Field of Classification Search
CPC ... H04W 84/045; H04W 48/08; H04W 48/18; H04W 4/023; H04W 64/003; H04J 11/0093
See application file for complete search history.

(56) References Cited

U.S. PATENT DOCUMENTS

2009/0298522 A1* 12/2009 Chaudhri et al. ............. 455/509
2010/0195566 A1*  8/2010 Krishnamurthy et al. .... 370/328

(Continued)

FOREIGN PATENT DOCUMENTS

EP           1944881 A2      7/2008
WO      WO 01/97430 A2    12/2001

(Continued)

OTHER PUBLICATIONS

"Reconfigurable Radio Systems (RRS); Use Cases for Operation in White Space Frequency Bands" ETSI Draft; 01004V017; European Telecommunications Standards Institute (ETSI; 650, Route des Lucioles; F-06921 Sophia-Antipolis; France; No. V0.1.7, Sep. 12, 2011, pp. 1-60, XP014067100, [retrieved on Sep. 12, 2011], paragraph [5.2.4.1]-paragraph [5.2.4.2], paragraph [5.3.4], figures 7, 15 (60 pages).

*Primary Examiner* — Quan M Hua
(74) *Attorney, Agent, or Firm* — Harrington & Smith (57) ABSTRACT

For controlling a wireless transmission of a network element of a radio access network where signal propagation is unknown, wherein the network element is configured to inhibit use of a licensed shared access spectrum, interference levels in predefined reservation zones are determined, which are introduced by the network element when using the licensed shared access spectrum. It is checked whether or not the interference levels violate agreed interference levels in the predefined reservation zones of the licensed shared access spectrum, and the network element is configured to allow use of the licensed shared access spectrum in case the interference levels do not violate the agreed interference levels in the predefined reservation zones.

20 Claims, 8 Drawing Sheets

(56) References Cited

U.S. PATENT DOCUMENTS

2010/0255794 A1 10/2010 Agnew .......................... 455/77
2012/0195210 A1* 8/2012 Grayson ...................... 370/252

FOREIGN PATENT DOCUMENTS

| WO | WO 2009/155016 A2 | 12/2009 |
| WO | WO 2011/128246 A1 | 10/2011 |

* cited by examiner

USE OF LICENSED SHARED SPECTRUM IN A RADIO ACCESS NETWORK WHERE SIGNAL PROPAGATION IS UNKNOWN

BACKGROUND OF THE INVENTION

1. Field of the Invention

The present invention relates to using a licensed shared access spectrum in a radio access network where signal propagation is unknown. In particular, the invention relates to controlling a wireless transmission of a network element of a radio access network where signal propagation is unknown.

2. Related Background Art

The following meanings for the abbreviations used in this specification apply:
- 3GPP Third Generation Partnership Project
- ALC ASA/LSA Control
- ASA Authorized Shared Access
- BS Base Station
- $BS_{ud}$ Base Station Uncoordinated Deployment
- C Cell
- CN Core Network
- DSL Digital Subscriber Line
- GNSS Global Navigation Satellite System
- GPS Global Positioning System
- HeMS HeNB Management System
- HeNB Home eNodeB
- IP Internet Protocol
- LAN Local Area Network
- LI Location Information
- LSA Licensed Shared Access
- LTE Long Term Evolution
- LV Location Verification
- OAM Operation Administration & Maintenance
- OMS OAM System
- RF Radio Frequency
- RSPG Radio Spectrum Policy Group
- UE User Equipment In an effort to extend capacity for broadband wireless access to a communications network system, base stations (Macro, Pico and Femto) have been introduced, which are enabled to use a licensed shared access spectrum, e.g. ASA (authorized shared access) spectrum also known as LSA (licensed shared access) spectrum. ASA/LSA is a third and complementary way of authorising spectrum, in addition to licensed and license-exempt (unlicensed) spectrum. ASA/LSA spectrum is typically owned by an incumbent (primary user) who allows other licensed operators (secondary user) to use this spectrum for their purpose. ASA/LSA allows support of different operators by using separated ASA/LSA resources. Each ASA/LSA resource is defined by a spectrum part and a corresponding time interval and location where this spectrum part is used.

In mobile networks spectrum utilization and allocation is performed via static configurations based on network planning data of a mobile network operator (MNO). With the introduction of ASA/LSA it is not longer possible to stay with these static configurations because ASA/LSA spectrum needs to be evacuated according to predefined terms and conditions if requested by the incumbent (primary user). The principle of >>my spectrum—my usage<< will not hold any longer. In other words the well known static spectrum allocation methods need to be complemented which leads to a paradigm change in mobile communication industry. In addition to the traditional exclusive spectrum assignment there is now also a new method where (in some regions) certain parts of the spectrum may no longer be exclusively assigned to a single operator but jointly assigned to several operators with the obligation to use it collectively.

As mentioned above a main characteristic of ASA/LSA is that the incumbent may reserve an ASA/LSA resource for own usage. Such reservations could be defined by static rules (e.g. a defined zone and/or time where the spectrum is used by the incumbent) or dynamic rules (e.g. evacuation of spectrum on request for emergency situations). In both cases zones where spectrum use under ASA/LSA is not allowed are defined by geographical area, time and transmitter/receiver characteristics. Additionally the evacuation lead time, this is the time between initializing the request to free up the ASA/LSA spectrum zone and the finalization of the spectrum evacuation, may be defined as another input parameter to the operator. The operator has to perform appropriate measures in the network, e.g. re-configurations or switch off ASA/LSA spectrum of specific base stations without violating the evacuation lead time in case of spectrum resource reservation actions triggered by the incumbent. Typically such measures are easy to realise because the location and behaviour of each operator base station and the reservation zones are known and can be used in a planning process to get the information needed to perform reservation actions.

Figure 1:
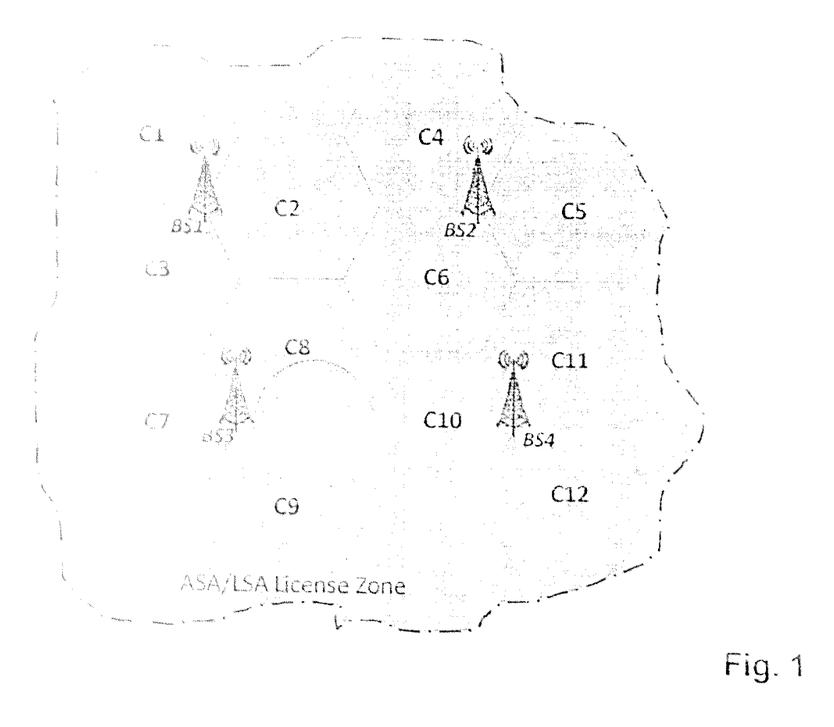
FIG. 1 shows a schematic diagram illustrating a licensed shared spectrum zone comprising a reservation zone in a cellular radio access network.

FIG. 1 shows such a scenario with four 3 sector base stations BS1, BS2, BS3 and BS4 covering a defined ASA/LSA license zone, where each sector defines an independent cell C1, C2, . . . C12. Inside the ASA/LSA license zone the incumbent has defined a reservation zone which needs to be evacuated on request.

Figure 2:
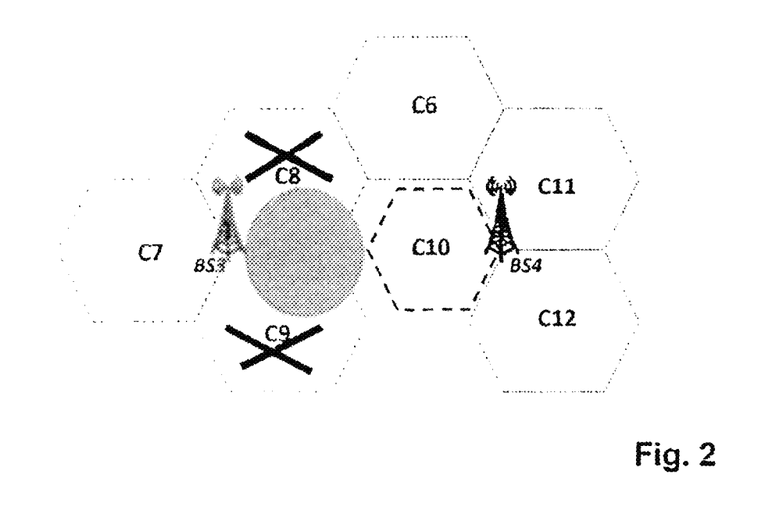
FIG. 2 shows a schematic diagram illustrating a process performed when the reservation zone is to be evacuated.

The operator uses the input to determine the affected cells C8, C9 and C10 and derives the measures for evacuation, e.g. switch off ASA/LSA spectrum for C8 and C9 and reconfigure C10 to reduce cell size, as illustrated in FIG. 2.

In case of unknown signal propagation of base stations, the described process does not work because e.g. the location of each base station is unknown and may even change several times in case of small base stations (Pico and Femto). This makes it nearly impossible to prepare a reliable measure to guarantee that a base station does not interfere with a defined ASA/LSA reservation zone which is shown as hatched area in FIGS. 1 and 2.

Unknown signal propagation due to uncoordinated deployment of base stations and unknown configuration of the base stations is an important issue at least for Femto, Pico and LTE-LAN installations, because all operate in licensed spectrum. When such types of base stations are used as senders/transmitters the operator has to guarantee that they are operated according to their license, i.e. using the licensed spectrum in the licensed area. Compared with Femto there is until today no method standardized to determine the exact location of a base station in case of uncoordinated deployment of base stations, but even for Femto the methods do not fulfill the requirements for ASA/LSA usage.

Femto is often used in home environments where the subscriber chooses the exact location of the base station. Based on the fact that Femto base stations are designed for easy installation and operation it may happen that a subscriber tries to use the Femto in a location where the operator has no license. To help operators to detect and prevent such situations 3GPP has introduced a process to verify the location of a Femto base station before allowing the base station to transmit. Following methods are available for location verification (LV):
  neighbourhood information (Femto base station scans neighbourhood and collects data from other base stations);

GNSS location information (Femto base station determines location coordinates based on GPS); and broadband connection information (Femto base station provides IP address and/or other broadband credentials).

It is allowed to use one method, or any combination of two methods, or all three methods. While the mentioned methods fit to a number of situations (e.g. GPS for Femto outdoor installations) there is also a high number of scenarios where the mentioned methods deliver only coarse location information or even none of these methods are available. The reason is that most Femto access points in residential deployments are installed indoors in areas where no macro coverage is available. Indoors does not allow to receive GPS signals and the broadband credentials are also not available because the Femto base station is in nearly all cases connected to a home router (DSL router) which provides a private IP address to the Femto base station (public IP address sharing).

As a result none of the defined methods for location verification fits to the ASA/LSA use cases.

SUMMARY OF THE INVENTION

The present invention aims at solving the above problems at least in part. Further, the invention aims at providing a solution for using a licensed shared access spectrum, e.g. an ASA/LSA spectrum, in conjunction with unknown signal propagation of network elements.

This is achieved by the method and apparatus as defined in the appended claims. The invention may also be implemented by a computer program product.

An advantage of the proposed procedure and its extensions is that a licensed shared access spectrum of an incumbent/owner can be used by a mobile operator without interfering predefined reservation zones of the licensed shared access spectrum. The procedure itself is highly reliable and offers many implementation options. This guarantees flexible and easy to realize adaptations to any mobile operator networks including various multivendor network elements.

In the following the invention will be described by way of exemplary embodiments thereof with reference to the accompanying drawings.

DESCRIPTION OF THE EXEMPLARY EMBODIMENTS

According to an exemplary embodiment of the invention, when a licensed shared access spectrum, e.g. an ASA/LSA spectrum, is to be used with network elements of an access network of a communications network system, with unknown signal propagation, per default these type of network elements are configured in a way not to use the licensed shared access spectrum. The use of the licensed shared access spectrum will be allowed as soon as it is guaranteed that such a network element does not violate agreed interference levels in predefined reservation zones of the licensed shared access spectrum. The interference levels may be defined equal or different for each reservation zone of the licensed shared access spectrum. The use of the licensed shared access spectrum may be not allowed when agreed interference levels in the predefined reservation zones are violated by such a network element. Here a network element may comprise entities such as access points, remote radio heads, base stations, etc.

Figure 3:
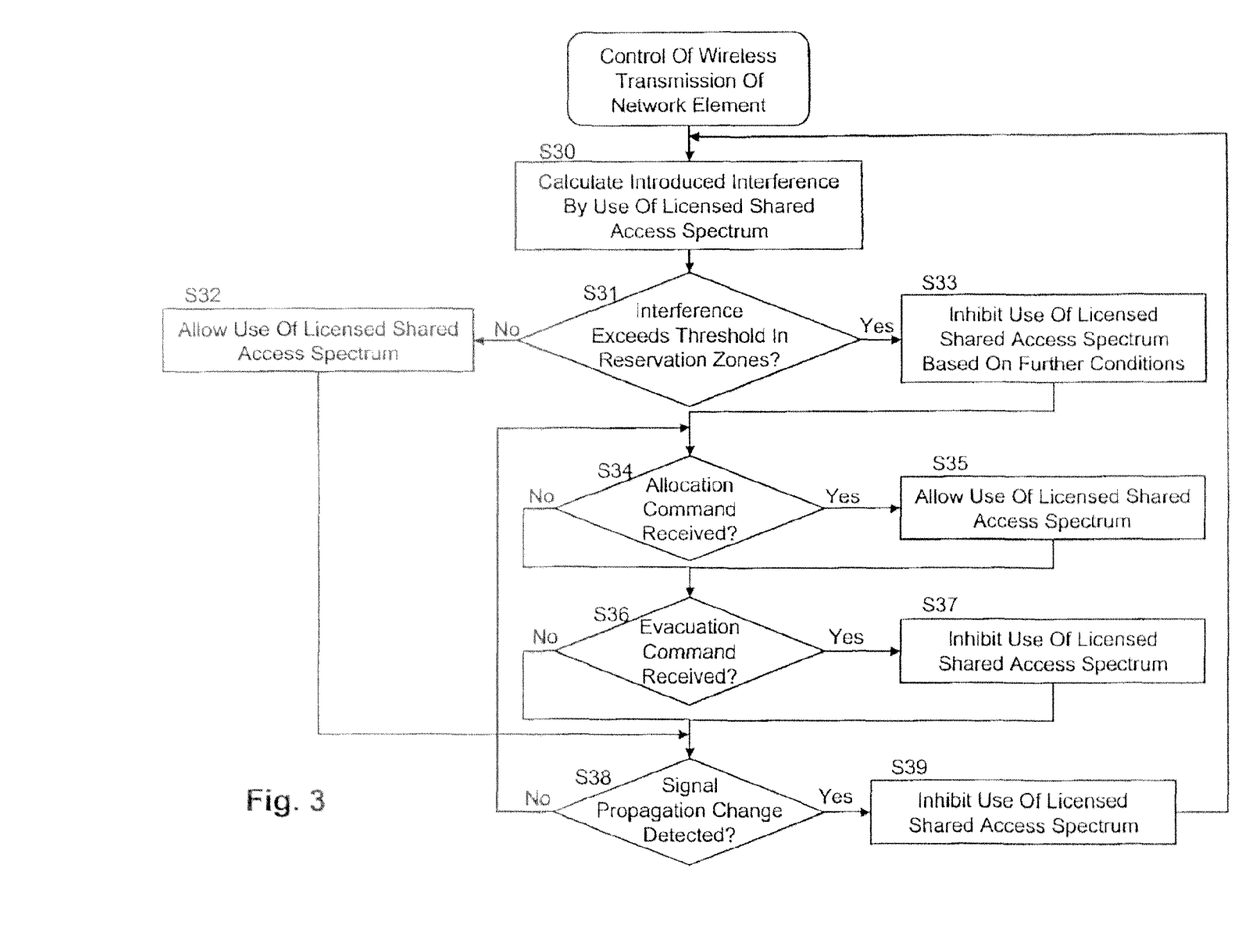
FIG. 3 shows a flow chart illustrating a method of controlling wireless transmission of a network element of an access network where signal propagation is unknown, according to an exemplary embodiment of the invention.

FIG. 3 shows a flow chart illustrating a method of controlling a wireless transmission of a network element with unknown signal propagation. In step S30, interference levels introduced by the network element when using a licensed shared access spectrum are calculated, wherein the network element is configured to inhibit use of the licensed shared access spectrum. In step S31 it is checked whether or not the calculated interference levels violate agreed interference levels in predefined reservation zones of the licensed shared access spectrum. In other words it is checked whether the calculated interference levels exceed a certain threshold representing the agreed interference levels. The certain threshold may be set in advance and may be adaptable. In step S32 the network element is configured to allow use of the licensed shared access spectrum in case the calculated interference levels do not violate the agreed interference levels, i.e. do not exceed the certain threshold (No in step S31).

This basic principle supports all kinds of use cases with static predefined reservation zones of the licensed shared access spectrum, i.e. permanent reservation zones as well as dynamical reservation zones, i.e. zones which are reserved or not reserved only for a defined time interval. On closer examination there is only one difference between dynamic and static reservation zones. Network elements may or may not interfere with a reservation zone of a licensed shared access spectrum. This is valid for both types, but it is necessary for the dynamic type to introduce a communication to the network elements that allows switching on and off the use of the licensed shared access spectrum. In other words, even network elements which interfere with the reservation zone are allowed to use the licensed shared access spectrum when the reservation zone is inactive.

As illustrated in FIG. 3, in case the calculated interference levels violate the agreed interference levels, i.e. do not exceed the certain threshold (Yes in step S31), use of the licensed shared access spectrum may be inhibited. However, in case an allocation command is received for allocating the reservation zones for use by the network element (step S34), use of the licensed shared access spectrum may be allowed (step S35). Then, in case an evacuation command for evacuating the reservation zones is received (step S36), use of the licensed shared access spectrum may be inhibited again (S37).

Figure 4:
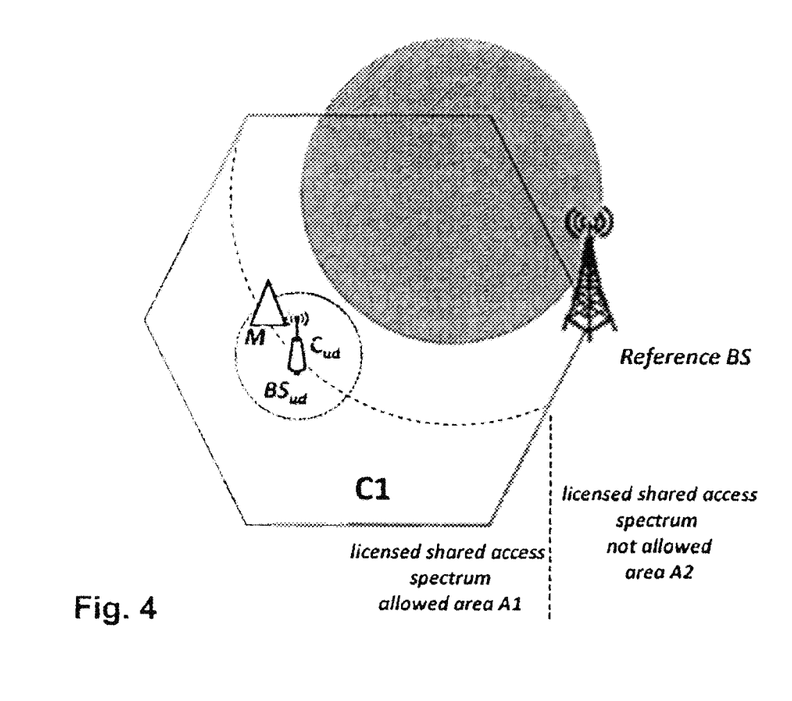
FIG. 4 shows a schematic diagram illustrating an area in which use of a licensed shared access spectrum by a network element is allowed, and an area in which use of the licensed shared access spectrum by the network element may be not allowed, according to an exemplary embodiment of the invention.

As shown in FIG. 4 it is possible to distinguish between two states for a cell $C_{ud}$ of a base station $BS_{ud}$ as an example of the above network element with unknown signal propagation, using the licensed shared access spectrum:

allowed area A1: cells in this area do not interfere with a reservation zone shown as hatched area in FIG. 4, and are always allowed to use the licensed shared access spectrum without any limitation; and not allowed area A2: cells in this area always interfere with the reservation zone and may not be allowed to use the licensed shared access spectrum.

Typically the exact position of the $BS_{ud}$ (e.g. Home-Femto) is not known by the operator, i.e. $BS_{ud}$ is not allowed to use the licensed shared access spectrum as long as it is not clear to which area it belongs. The following procedure may be used to determine whether the $BS_{ud}$ is located in A1 or A2.

A defined location (defined location coordinates) of the reservation zone of the licensed shared access spectrum may be used to calculate the areas A1 and A2 for all $BS_{ud}$ types used in an operator network. A $BS_{ud}$ type may be given by hardware features, e.g. antenna, technical key figures, etc., and a specific configuration. It is to be noted that when parameters are configured for self-management, e.g. min-max range for SON or Femto, it is necessary to use the worst case parameters for calculating A1 and A2, i.e. the protection of the reservation zone has always highest priority.

The $BS_{ud}$ is configured to use an uncritical licensed or unlicensed spectrum and not to use the licensed shared access spectrum. Measurement points M with reference location data, i.e. UEs or Femto base stations in listening mode, which operate in a vicinity of the $BS_{ud}$ are used to measure received signals from the $BS_{ud}$ in different locations within a macro coverage area. It is possible to use only one type of measurement points or to combine different types.

When reference location data of M are not available, it is also possible to calculate reference location data by using location determination information as defined by 3GPP, i.e. network-assisted GNSS methods, downlink positioning, enhanced cell ID method, etc.

Measurements including the location data of M and a received signal level from the $BS_{ud}$ may be reported upwards and evaluated within the communications network system to obtain a current location of the $BS_{ud}$. In other words, the location of the $BS_{ud}$ may be determined via measurement reports generated by the measurement points measuring signal levels from the network element using a spectrum different from the licensed shared access spectrum and providing information to determine the location of each measurement point. The $BS_{ud}$ is checked whether it belongs to A1 or A2. In case it belongs to A1, the $BS_{ud}$ is reconfigured to use the licensed shared access spectrum.

The communications network system may initiate additional measurements for the licensed shared access spectrum used by the $BS_{ud}$ in A1 to verify that there is no interference with the reservation zone. In case that interference above the agreed interference levels, i.e. above the certain threshold, is detected, the use of the licensed shared access spectrum may be switched off again at the $BS_{ud}$. It is to be noted that this option is not shown in FIG. 3.

Additionally the measurements may be used as feedback to check if a configuration modification at the $BS_{ud}$ will solve the interference level violation for the $BS_{ud}$ type or if the areas A1 and A2 need to be modified. Depending on the feedback result, all base stations $BS_{ud}$ of the same type in cell C1 may be reconfigured either with new configuration parameters or to inhibit use of the licensed shared access spectrum when the area, to which the $BS_{ud}$ belongs, is the new area A2.

Moreover, in case the calculated interference levels violate the agreed interference levels within a predetermined threshold, configuration parameters for the $BS_{ud}$ may be calculated that changes the signal propagation of the $BS_{ud}$ to overcome the interference violation, and the $BS_{ud}$ may be reconfigured with the calculated configuration parameters. The predetermined threshold may be set in advance and may be adaptable. The predetermined threshold may be set to a rather small value.

Use cases where the location of the $BS_{ud}$ is not reliable (e.g. moving of home Femtos) need additional measures to guarantee that the reservation zone is not interfered when using the licensed shared access spectrum. For this purpose, continuous measurements via the measurement points M may be used to monitor the location of the $BS_{ud}$. When a location change is detected the $BS_{ud}$ may be switched off immediately. This possibility is shown in FIG. 3. In step S38, when a location change of the base station is detected, the process proceeds to step S39 to inhibit use of the licensed shared access spectrum. Otherwise, the process returns to step S34. Further it is possible to calculate the new location and to check if the $BS_{ud}$ is in area A1, i.e. no interference with the reservation zone, usage of licensed shared access spectrum allowed, or in area A2, i.e. interference with the reservation zone, usage of licensed shared access spectrum not allowed.

In other words, in step S38 it is checked whether or not there is a change of signal propagation of the $BS_{ud}$, which may be caused e.g. by a location change of the $BS_{ud}$ as described above, or may be caused by a configuration change of the $BS_{ud}$. In case such signal propagation change is detected, the $BS_{ud}$ may be configured to inhibit use of the licensed shared access spectrum. The signal propagation change may be detected via measurement reports generated e.g. by the measurement points M measuring signal levels from the $BS_{ud}$ and providing information to determine the location of each measurement point M.

It is to be noted that the order of steps S34, S36 and S38 is not limited to the one shown in FIG. 3.

When the $BS_{ud}$ is moved to another cell of BS1 shown in FIG. 1 or to any cell of another base station of the access network, the same process can be used to switch on and off the use of the licensed shared access spectrum of the $BS_{ud}$. The described process even works in case of several independent ASA/LSA reservation zones with the same spectrum and several independent ASA/LSA reservation zones with different spectrum. In the latter case the process may be extended in a way to include the spectrum information to the reservation zone and to check in the process if the licensed shared access spectrum used by the $BS_{ud}$ affects the reservation zone.

The location monitoring process may be seen as a first step to the dynamic reservation zone of the licensed shared access spectrum. As explained above with the dynamic reservation zone a function to override the licensed shared access spectrum allowed or not allowed result is introduced. The owner of the licensed shared access spectrum may request >>his<< spectrum from or offers it to the operator for one or several reservation zones. In other words, the owner may issue an evacuation command or an allocation command. The operator has to evacuate or allocate the licensed shared access spectrum according to agreed contract with the owner. The requests and offers may be sent offline or online but should be processed by the operator using one of the options shown in FIG. 5.

Figure 5:
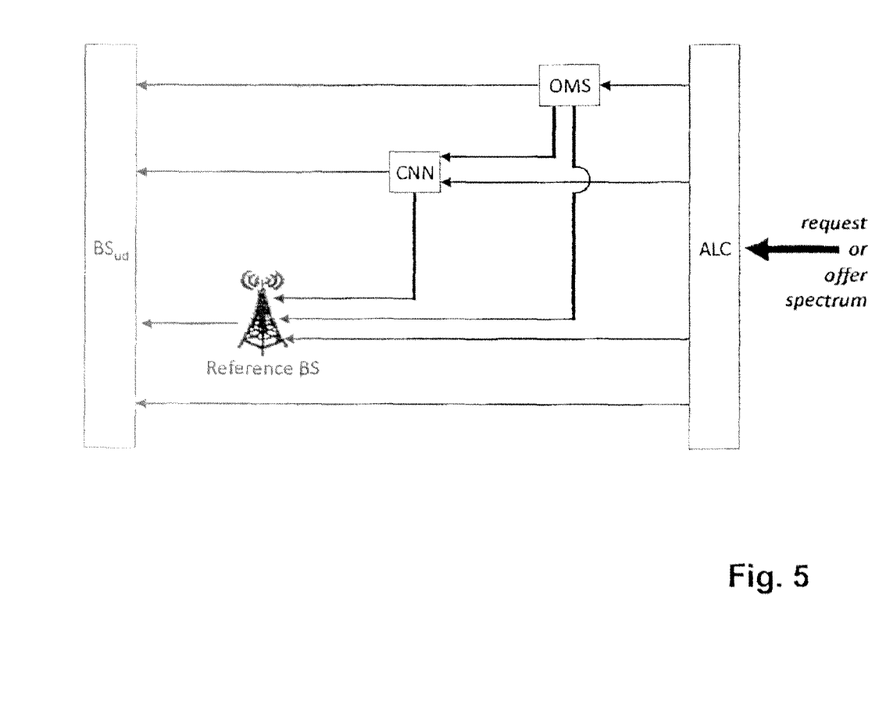
FIG. 5 shows a schematic block diagram illustrating an arrangement for communicating request or offer spectrum information according to an exemplary embodiment of the invention.

Request or offer spectrum information triggers a spectrum control entity ALC of an operator, to initiate an evacuation or allocation command to a mobile network. There are several options how to inform the $BS_{ud}$ to inhibit or allow the use of the requested or offered spectrum. Depending on implementation, a new interface may be introduced, e.g. between ALC and $BS_{ud}$, or already standardized ones, e.g. S1, X2, management interface, air interface, etc., may be extended. Further the evacuation and/or allocation command may be sent directly or indirectly from the ALC to the $BS_{ud}$, i.e. the ALC may use existing functions of the communications network system in any combinations like OAM systems (OMS), core network nodes (CNN), e.g. MME in case of LTE, or other base stations (reference BS).

Figure 6:
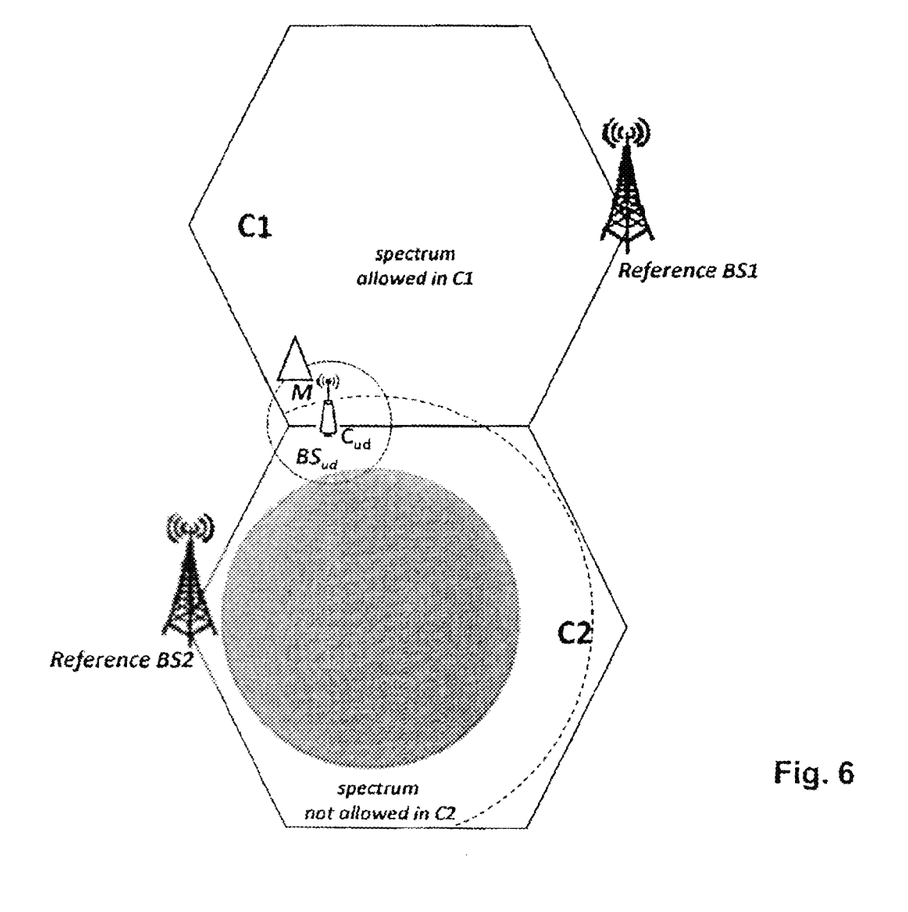
FIG. 6 shows a schematic diagram illustrating an area in which use of a licensed shared access spectrum by a network element is allowed, and an area in which use of the licensed shared access spectrum by the network element may be not allowed according to an exemplary embodiment of the invention, when the network element is near to the border of two cells.

There are some cases where the $BS_{ud}$ is near to the border of at least two cells and the cell $C_{ud}$ of the $BS_{ud}$ affects the reservation zone in one cell but not in the other. FIG. 6 shows such a scenario, the reservation zone being shown as hatched area.

To cover also these scenarios the above process can be extended. When the measurement point M is near to a cell border (C1 and C2) it receives data from more reference base stations (BS1 and BS2). In this case the network should check for every cell (C1 and C2) separately if the reservation zone is violated, i.e. if interference estimated e.g. in step S30 in FIG. 3, violates agreed interference levels. When in at least one cell (C1 or C2) the reservation zone is violated $BS_{ud}$ is configured not to use the licensed shared access spectrum.

Figure 7:
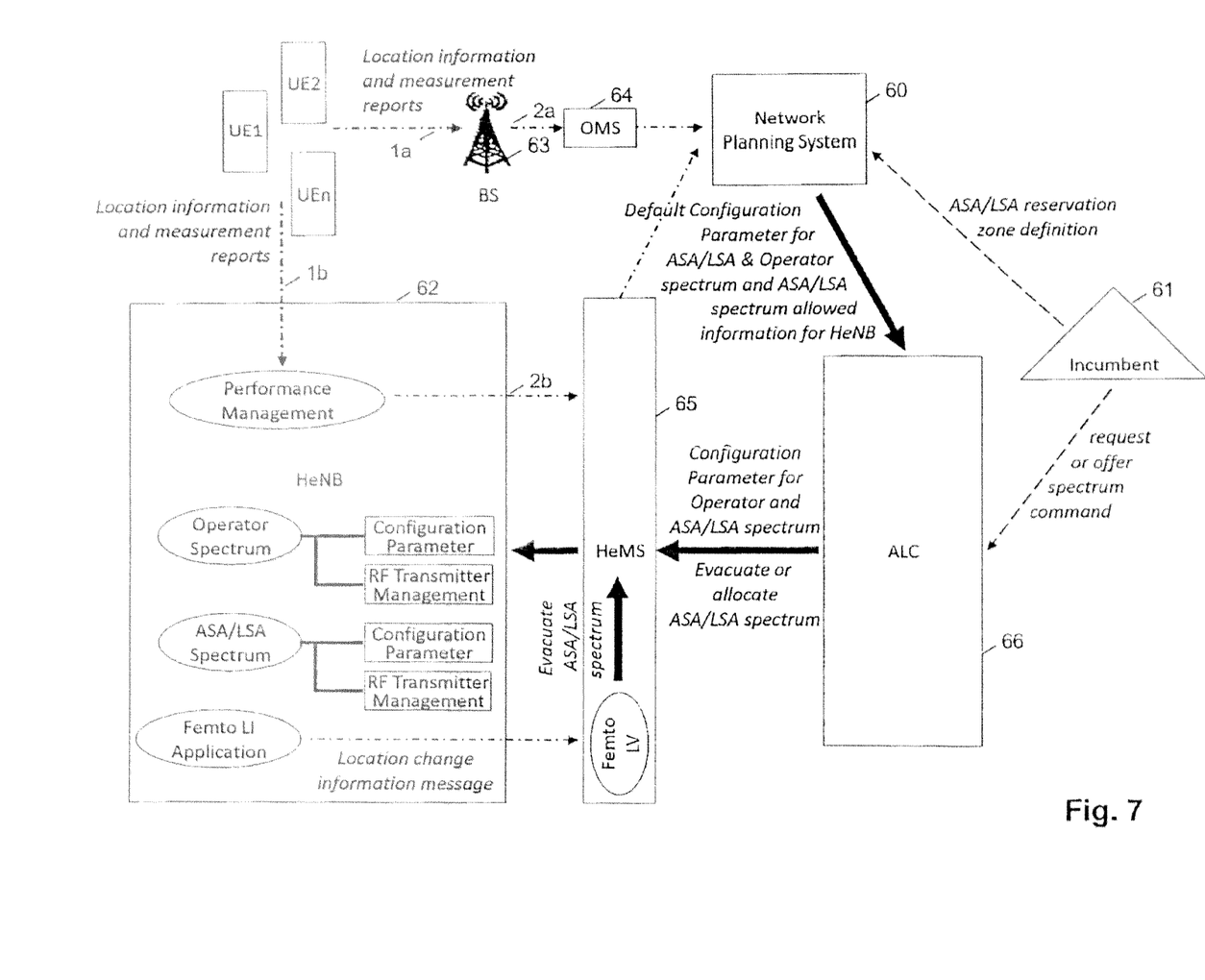
FIG. 7 shows an implementation example for a home Femto base station which uses a licensed shared access spectrum dynamically according to an exemplary embodiment of the invention.

FIG. 7 shows an implementation for a Home Femto base station which uses a licensed shared access spectrum dynamically to increase bandwidth whenever possible. As a prerequisite an operator provides default configuration parameter for ASA/LSA & operator spectrum and ASA/LSA spectrum allowed information for a HeNB 62 and information of defined ASA/LSA reservation zones to his network planning system 60. The ASA/LSA reservation zones information (ASA/LSA reservation zone definition) may be provided by an Incumbent 61 which is the owner of the ASA/LSA spectrum, as shown by a dashed arrow from the Incumbent 61 to the network planning system 60. The default configuration parameter for ASA/LSA & operator spectrum and ASA/LSA spectrum allowed information for the HeNB 62 may be submitted from the network planning system 60 to an ALC 66 and from the ALC 66 to the HeNB 62, as shown by bold arrows.

In a first step the HeNB (LTE Femto BS) 62 is configured to use operator owned spectrum only, as illustrated by a bold arrow from the HeMS 65 to the HeNB 62. An RF transmitter of the HeNB 62 for the ASA/LSA spectrum is set to disabled, i.e. the HeNB 62 is not able to use the ASA/LSA spectrum. A Femto location information (LI) application of the HeNB 62 is used to guarantee that the HeNB 62 is operated in an allowed area. An operator network starts to collect measurement reports with location information from UEs UE1, UE2, ..., UEn either via a Macro BS 63 and respective OMS 64 (dash dotted arrows 1a, 2a) or via the HeNB 62 (a performance management of the HeNB 62) and a respective HeNB Management System (HeMS) 65 (dash-dotted arrows 1b, 2b). The HeMS 62 and the OMS 64 provide the received measurement reports including the location information to the network planning system 60 as shown by dash-dotted arrows.

The network planning system 60 filters the measurement reports which are relevant for the HeNB 62 and uses the location information and the measurements to calculate the current location of the HeNB 62. Further, ASA/LSA reservation zone data are used to check whether or not the HeNB 62 is allowed to use the ASA/LSA spectrum permanently (i.e. the HeNB 62 is in the allowed area and does not affect the ASA/LSA reservation zone). Further the network planning system 60 is used to calculate ASA/LSA configuration parameters for a HeNB configuration and to provide these data to the ALC 66 as depicted by the bold arrow.

In a second step the ALC 66 initiates via the HeMS 65 the configuration at the HeNB 62 for using the ASA/LSA spectrum, as depicted by a bold arrow. Additionally the information whether the ASA/LSA spectrum is allowed or not allowed for the HeNB 62 is used to enable or disable the use of the RF transmitter for the ASA/LSA spectrum.

Before the HeNB 62 is allowed to use the ASA/LSA spectrum the HeMS 65 activates a location change supervision to monitor location changes. All location changes are reported to a Femto location verification function of the HeMS 65, as illustrated by a dash-dotted arrow. When a location change is detected the HeMS 65 generates a command to stop the RF transmitter for ASA/LSA spectrum immediately, as illustrated by a bold arrow from the Femto location verification. The ASA/LSA spectrum may be blocked for usage by the HeNB 62 as long as the network planning system 60 has not calculated configuration data and ASA/LSA spectrum allowed information for the new location of the HeNB 62. The configuration data and ASA/LSA spectrum allowed information for the new location of the HeNB 62 may be provided by the network planning system 60 via the ALC 66 and the HeMS 65 to the HeNB 62, as illustrated by the bold-type arrows.

Whenever the Incumbent 61 requests or offers the ASA/LSA spectrum to the operator, as illustrated by a dashed arrow from the Incumbent 61 to the ALC 66, the ALC 66 initiates an evacuation or allocation command to the HeMS 65 as shown by the bold arrow from the ALC 66 to the HeMS 65. The HeMS 65 uses these commands to override an RF transmitter on/off state as follows:

evacuation command disables the RF transmitter for ASA/LSA spectrum; and offer command enables the RF transmitter for ASA/LSA spectrum.

Figure 8:
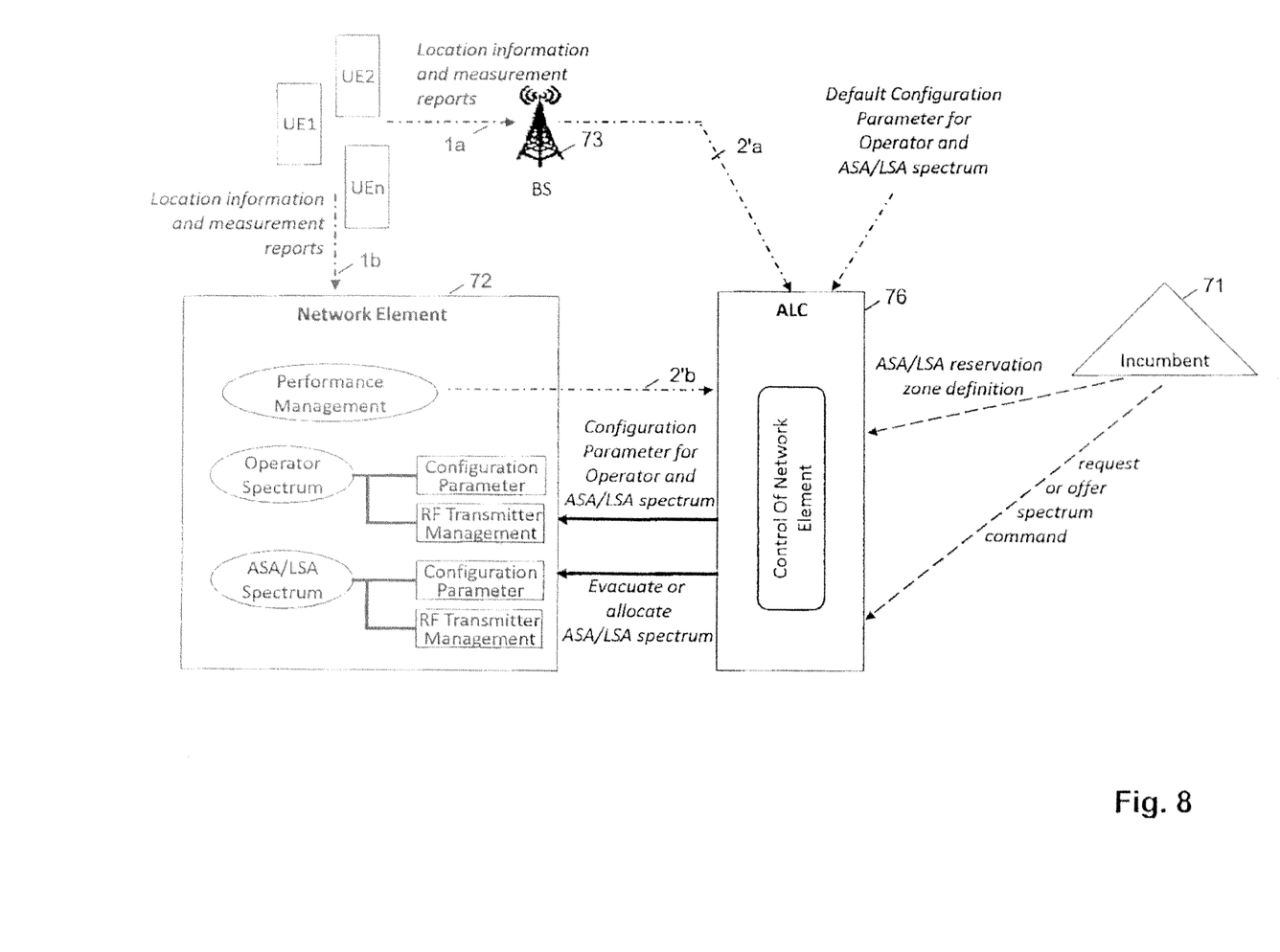
FIG. 8 shows an implementation example for a network element which uses a licensed shared access spectrum dynamically according to an exemplary embodiment of the invention.

FIG. 8 illustrates an implementation example for a network element 72 which uses a licensed shared access spectrum dynamically to increase bandwidth whenever possible according to an embodiment of the invention. As a prerequisite, operator information (default configuration parameter for operator and ASA/LSA spectrum, ASA/LSA spectrum allowed information) as depicted by a dash-dotted arrow, and defined ASA/LSA reservation zones are provided to an apparatus (ALC) 76 for controlling wireless transmission of the network element 72 whose signal propagation is unknown. The ASA/LSA reservation zones information (ASA/LSA reservation zone definition) may be provided by an Incumbent 71 which is the owner of the ASA/LSA spectrum, as shown by a dashed arrow.

In a first step the network element 72 is configured to use operator owned spectrum only, as illustrated by a bold arrow from the apparatus 76 to the network element 72. An RF transmitter of the network element 72 for the ASA/LSA spectrum is set to disabled, i.e. the network element 72 is not able to use the ASA/LSA spectrum. Measurement reports with location information from UEs UE1, UE2, ..., UEn are collected by the ALC 76 either via a Macro BS 73 (dash-dotted arrows 1a, 2'a) or via the network element 72 (a performance management of the network element 72) (dash-dotted arrows 1b, 2%).

The ALC 76 filters the measurement reports which are relevant for the network element 72 and uses the location information and the measurements to calculate the current location of the network element 72. Further, ASA/LSA reservation zone data are used to check whether or not the network element 72 is allowed to use the ASA/LSA spectrum permanently (i.e. the network element 72 is in the allowed area and does not affect the ASA/LSA reservation zone). Further the ALC 76 is used to calculate ASA/LSA configuration parameters for a network element configuration.

In a second step the ALC 76 initiates the configuration at the network element 72 for using the ASA/LSA spectrum, as illustrated by the bold-type arrow from the ALC 76 to the network element 72. Additionally the information whether the ASA/LSA spectrum is allowed or not allowed for the network element 72 is used to enable or disable the use of the RF transmitter for the ASA/LSA spectrum.

Before the network element 72 is allowed to use the ASA/LSA spectrum the ALC 76 activates a location change supervision to monitor location changes. When a location change is detected the ALC 76 generates a command to stop the RF transmitter for ASA/LSA spectrum immediately. The ASA/LSA spectrum may be blocked for usage by the network element 72 as long as the ALC 76 has not calculated configuration data and ASA/LSA spectrum allowed information for the new location of the network element 72. The configuration data and ASA/LSA spectrum allowed information for the new location of the network element 72 may be provided by the ALC 76 to the network element 72 as illustrated by the bold arrow.

Whenever the Incumbent 71 requests or offers the ASA/LSA spectrum to the operator as illustrated by a dashed arrow, the ALC 76 initiates an evacuation or allocation command to the network element 72 as illustrated by a bold arrow. These commands are used to override an RF transmitter on/off state as described above with respect to FIG. 7.

As can be seen from the above implementation examples, the ALC may provide the complete control functionality as shown in FIG. 8. However, this control functionality may be distributed to network entities in order to reuse and extend existing functionalities as illustrated in FIG. 7. FIG. 7 shows an implementation example for Femto where parts of the control functionality is implemented in external boxes. External boxes means typically management systems (e.g. element managers, network managers, SON servers, network repositories, data warehouses, network planning systems) and/or even the network element itself (e.g. management agent or local SON function).

Figure 9:
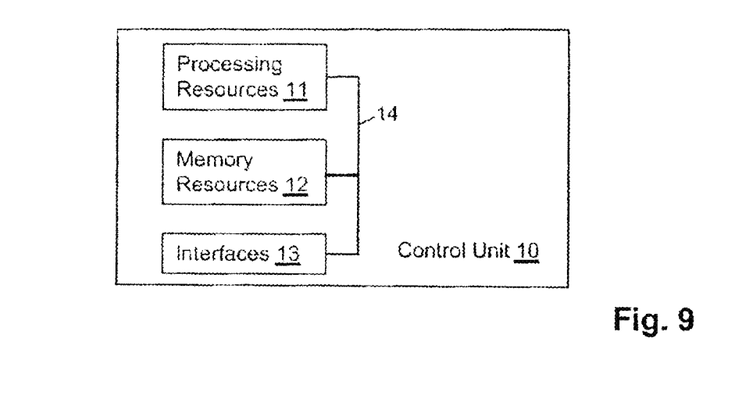
FIG. 9 illustrates a simplified block diagram of a control unit 10 suitable for use in practicing the exemplary embodiments of this invention.

Now reference is made to FIG. 9 illustrating a simplified block diagram of a control unit 10 suitable for use in practicing the exemplary embodiments of this invention. The control unit 10 comprises processing resources 11, memory resources 12 which may store a program, and interfaces 13, which are connected by a link 14. The control unit 10 may execute the processes shown in FIG. 3 and its modifications and extensions described above, using its processing resources 11, memory resources 12 and interfaces 13. For example, the control unit 10 may be part of or used by the network planning system 60, HeNB 62, OMS 64, HeMS 65 and ALC 66 shown in FIG. 7. Referring to FIG. 8, the control unit 10 may be part of or used by the ALC 76.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

The program stored in the memory resources 12 may include program instructions that, when executed by the processing resources, enable the control unit 10 to operate in accordance with the exemplary embodiments of this invention, as detailed above.

In general, the exemplary embodiments of this invention may be implemented by computer software stored in the memory resources 12 and executed by the processing resources 11, or by hardware, or by a combination of software and/or firmware and hardware.

The memory resources 12 may be of any type suitable to the local technical environment and may be implemented using any suitable data storage technology, such as semiconductor-based memory devices, magnetic memory devices and systems, optical memory devices and systems, fixed memory and removable memory. The processing resources 11 may be of any type suitable to the local technical environment, and may include one or more of general purpose computers, special purpose computers, microprocessors, digital signal processors (DSPs) and processors based on a multi-core processor architecture, as non-limiting examples.

According to an aspect of the invention, an apparatus for controlling a wireless transmission of a network element of a radio access network where signal propagation is unknown is provided, wherein the network element is configured to inhibit use of a licensed shared access spectrum. The apparatus may comprise the control unit 10 shown in FIG. 9. The apparatus comprises means for determining interference levels in predefined reservation zones, introduced by the network element when using the licensed shared access spectrum, means for checking whether or not the interference levels violate agreed interference levels in the predefined reservation zones of the licensed shared access spectrum, and means for configuring the network element to allow use of the licensed shared access spectrum in case the means for checking determines that the interference levels do not violate the agreed interference levels in the predefined reservation zones.

The apparatus may comprise means for detecting changes of a signal propagation of the network element, and means for, upon detection of any change of the signal propagation of the network element by the means for detecting, configuring the network element to inhibit use of the licensed shared access spectrum and causing the means for determining and means for checking to perform the determination and check again.

The apparatus may comprise means for receiving an offer command for the predefined reservation zones and/or an evacuation command for the predefined reservation zones, and means for, in case the interference levels determined by the means for determining violate the agreed interference levels and the network element is configured to inhibit use of the licensed shared access spectrum, enabling use of the licensed shared access spectrum upon receipt of the offer command for the predefined reservation zones by the means for receiving, and means for, in case the interference levels violate the agreed interference levels and the network element is configured to allow use of the licensed shared access spectrum, disabling use of the licensed shared access spectrum upon receipt of the evacuation command for the predefined reservation zones by the receiving means.

The means for checking whether or not the interference levels violate agreed interference levels in predefined reservation zones of the licensed shared access spectrum, may comprise means for detecting whether or not the network element is located in an allowed area in which the interference levels do not violate the agreed interference levels of the predefined reservation zones.

The means for checking may further comprise means for calculating the allowed area for the network element based on a location of the predefined reservation zones and the signal propagation of the network element for the licensed shared access spectrum, means for configuring the network element to use a spectrum different from the licensed shared access spectrum, means for determining the location of the network element via measurement reports generated by measurement points measuring signal levels from the network element using the spectrum different from the licensed shared access spectrum and providing information to determine the location of each measurement point, means for checking whether or not the location of the network element belongs to the allowed area, and means for configuring the network element to allow use of the licensed shared access spectrum in case the location of the network element belongs to the allowed area.

The apparatus may further comprise means for initiating additional measurements for the licensed shared access spectrum used by the network element located in the allowed area for checking whether or not the interference levels violate the agreed interference levels in the predefined reservation zones, and means for, in case the interference levels violate the agreed interference levels, configuring the network element to inhibit use of the licensed shared access spectrum.

The apparatus may further comprise means for determining a modification of the allowed area from the additional measurements, means for checking whether or not the location of the network element belongs to the modified allowed area, and means for configuring the network element to inhibit use of the licensed shared access spectrum in case the location of the network element does not belong to the modified allowed area.

The apparatus may further comprise means for continuously monitoring the location of the network element via measurement reports generated by the measurement points measuring signal levels from the network element and providing information to determine the location of each measurement point.

The means for continuously monitoring the location of the network element may comprise means for detecting a location change of the network element, means for, in case location change of the network element is detected, checking whether or not the changed location belongs to the allowed area, and means for configuring the network element to inhibit use of the licensed shared access spectrum in case the changed location of the network element does not belong to the allowed area, and means for configuring the network element to allow use of the licensed shared access spectrum in case the changed location of the network element belongs to the allowed area.

The means for checking whether or not the interference levels violate agreed interference levels in the predefined reservation zones of the licensed shared access spectrum may comprise means for checking whether or not the interference levels violate the agreed interference levels within a predetermined threshold. The apparatus may comprise means for, in case the interference levels violate the agreed interference levels within the predetermined threshold, calculating configuration parameters for the network element that change the signal propagation of the licensed shared access spectrum of the network element to overcome the interference violation, and means for reconfiguring the network element with the configuration parameters calculated by the means for calculating.

The apparatus may comprise means for continuously monitoring the signal propagation of the network element via measurement reports generated by measurement points measuring signal levels from the network element and providing information to determine the location of each measurement point.

The above-described means may be implemented by the processing resources 11, memory resources 12 and interfaces 13 of the control unit 10.

It is to be understood that the above description is illustrative of the invention and is not to be construed as limiting the invention. Various modifications and applications may occur to those skilled in the art without departing from the true spirit and scope of the invention as defined by the appended claims.

The invention claimed is:

1. A method comprising:
   determining interference levels in predefined reservation zones, introduced by a network element when using a licensed shared access spectrum;
   calculating an allowed area for the network element based on locations of the predefined reservation zones and signal propagation of the network element for the licensed shared access spectrum;
   configuring the network element to use a spectrum different from the licensed shared access spectrum;
   determining the location of the network element via measurement reports generated by measurement points that measure signal levels from the network element using the spectrum different from the licensed shared access spectrum and that provide information to determine the location of each measurement point;
   checking whether the interference levels violate agreed interference levels in the predefined reservation zones of the licensed shared access spectrum, wherein the checking comprises detecting whether the network element is located in the allowed area in which the interference levels do not violate the agreed interference levels of the predefined reservation zones; and
   configuring the network element to allow use of the licensed shared access spectrum in case the location of the network element belongs to the allowed area and the interference levels do not violate the agreed interference levels in the predefined reservation zones.

2. The method of claim 1, comprising:
   upon detecting any change of a signal propagation of the network element, configuring the network element to inhibit use of the licensed shared access spectrum and performing the steps of claim 1 again.

3. The method of claim 1, comprising:
   in case the interference levels violate the agreed interference levels and the network element is configured to inhibit use of the licensed shared access spectrum, enabling use of the licensed shared access spectrum upon receiving an offer command for the predefined reservation zones; and in case the interference levels violate the agreed interference levels and the network element is configured to allow use of the licensed shared access spectrum, disabling use of the licensed shared access spectrum upon receiving an evacuation command for the predefined reservation zones.

4. The method of claim 1, comprising:
initiating additional measurements for the licensed shared access spectrum used by the network element located in the allowed area for checking whether or not the interference levels violate the agreed interference levels in the predefined reservation zones; and
in case the interference levels violate the agreed interference levels, configuring the network element to inhibit use of the licensed shared access spectrum.

5. The method of claim 4, comprising:
determining a modification of the allowed area from the additional measurements; and
configuring the network element to inhibit use of the licensed shared access spectrum in case the location of the network element does not belong to the modified allowed area.

6. The method of claim 1, comprising:
continuously monitoring the location of the network element via the measurement reports generated by the measurement points that measure signal levels from the network element and that provide information to determine the location of each measurement point.

7. The method of claim 6, comprising:
in case a location change of the network element is detected, checking whether or not the changed location belongs to the allowed area; and
configuring the network element to inhibit use of the licensed shared access spectrum in case the changed location of the network element does not belong to the allowed area; and
configuring the network element to allow use of the licensed shared access spectrum in case the changed location of the network element belongs to the allowed area.

8. The method of claim 4, comprising:
in case the interference levels violate the agreed interference levels within a predetermined threshold, calculating configuration parameters for the network element that change the signal propagation of the licensed shared access spectrum of the network element to overcome the interference violation; and
reconfiguring the network element with the configuration parameters calculated.

9. The method of claim 2, comprising:
continuously monitoring the signal propagation of the network element via the measurement reports generated by measurement points that measure signal levels from the network element and that provide information to determine the location of each measurement point.

10. A computer program product comprising a non-transitory computer-readable medium including a program comprising software code portions stored thereon, the software code portions executable by a processing device, to cause the processing device to perform the steps of claim 1 when the program is run on the processing device.

11. The computer program product according to claim 10, wherein the program is directly loadable into an internal memory of the processing device.

12. An apparatus comprising:
at least one processor; and
at least one non-transitory memory including computer program code,
the at least one memory and the computer program code configured to, with the at least one processor, cause the apparatus to:
determine interference levels in predefined reservation zones, introduced by a network element when using a licensed shared access spectrum;
calculate an allowed area for the network element based on locations of the predefined reservation zones and signal propagation of the network element for the licensed shared access spectrum;
configure the network element to use a spectrum different from the licensed shared access spectrum;
determine the location of the network element via measurement reports generated by measurement points that measure signal m the network element using the spectrum different from the licensed shared access spectrum and that provide information to determine the location of each measurement point;
check whether or not the interference levels violate agreed interference levels in the predefined reservation zones of the licensed shared access spectrum, wherein the checking comprises detecting whether the network element is located in the allowed area in which the interference levels do not violate the agreed interference levels of the predefined reservation zones; and
configure the network element to allow use of the licensed shared access spectrum in case the location of the network element belongs to the allowed area and the interference levels do not violate the agreed interference levels in the predefined reservation zones.

13. The apparatus of claim 12, wherein the at least one memory and the computer program code are configured to cause the apparatus to:
detect changes of a signal propagation of the network element; and
upon detection of any change of the signal propagation of the network element, configure the network element to inhibit use of the licensed shared access spectrum and to re-perform the determination of interference levels in predefined zone, check of whether the interference levels violate the agreed interference levels, and configuration of the network element to allow use of the licensed shared access spectrum.

14. The apparatus of claim 12, wherein the at least one memory and the computer program code are configured to cause the apparatus configured to:
receive an offer command for the predefined reservation zones and/or an evacuation command for the predefined reservation zones; and
in case the interference levels violate the agreed interference levels and the network element is configured to inhibit use of the licensed shared access spectrum, enable use of the licensed shared access spectrum upon receipt of the offer command for the predefined reservation zones; and
in case the interference levels violate the agreed interference levels and the network element is configured to allow use of the licensed shared access spectrum, disable use of the licensed shared access spectrum upon receipt of the evacuation command for the predefined reservation zones.

15. The apparatus of claim 12, wherein the at least one memory and the computer program code are configured to cause the apparatus to:
- initiate additional measurements for the licensed shared access spectrum used by the network element located in the allowed area for checking whether or not the interference levels violate the agreed interference levels in the predefined reservation zones; and
- in case the interference levels violate the agreed interference levels, configure the network element to inhibit use of the licensed shared access spectrum.

16. The apparatus of claim 15, wherein the at least one memory and the computer program code are configured to cause the apparatus to:
- determine a modification of the allowed area from the additional measurements;
- check whether or not the location of the network element belongs to the modified allowed area; and
- configure the network element to inhibit use of the licensed shared access spectrum in case the location of the network element does not belong to the modified allowed area.

17. The apparatus of claim 12, wherein the at least one memory and the computer program code are configured to cause the apparatus to:
- continuously monitor the location of the network element via the measurement reports generated by the measurement points that measure signal levels from the network element and that provide information to determine the location of each measurement point.

18. The apparatus of claim 17, wherein the at least one memory and the computer program code are configured to cause the apparatus to:
- detect a location change of the network element;
- in case location change of the network element is detected, check whether or not the changed location belongs to the allowed area; and
- configure the network element to inhibit use of the licensed shared access spectrum in case the changed location of the network element does not belong to the allowed area; and
- configure the network element to allow use of the licensed shared access spectrum in case the changed location of the network element belongs to the allowed area.

19. The apparatus of claim 15, wherein the at least one memory and the computer program code are configured to cause the apparatus to:
- check whether or not the interference levels violate the agreed interference levels within a predetermined threshold;
- in case the interference levels violate the agreed interference levels within the predetermined threshold, calculate configuration parameters for the network element that change the signal propagation of the licensed shared access spectrum of the network element to overcome the interference violation; and
- reconfigure the network element with the configuration parameters calculated.

20. The apparatus of claim 13, wherein the at least one memory and the computer program code are configured to cause the apparatus to:
- continuously monitor the signal propagation of the network element via the measurement reports generated by measurement points that measure signal levels from the network element and that provide information to determine the location of each measurement point.

* * * * *

UNITED STATES PATENT AND TRADEMARK OFFICE
CERTIFICATE OF CORRECTION

PATENT NO. : 9,332,553 B2  
APPLICATION NO. : 13/935717  
DATED : May 3, 2016  
INVENTOR(S) : Christian Markwart, Simone Redana and Karl-Josef Friederichs Page 1 of 1

It is certified that error appears in the above-identified patent and that said Letters Patent is hereby corrected as shown below:

In the claims

In Claim 12:
Column 14, line 19, "m" should be deleted and -- levels from -- should be inserted.

In Claim 12:
Column 14, line 23, "or not" should be deleted.

Signed and Sealed this
Twenty-first Day of June, 2016

Michelle K. Lee
*Director of the United States Patent and Trademark Office*